United States Patent [19]

Wopinski

[11] Patent Number: 4,882,921
[45] Date of Patent: Nov. 28, 1989

[54] KING PIN LOCK

[76] Inventor: Frank Wopinski, 24320 Ave. 95, Terra Bella, Calif. 93270

[21] Appl. No.: 278,481

[22] Filed: Dec. 1, 1988

[51] Int. Cl.$^4$ ............................................. F16B 41/00
[52] U.S. Cl. ........................................ 70/232; 70/231
[58] Field of Search .................. 70/232, 231, 229, 14, 70/258, 417; 280/507

[56] References Cited

U.S. PATENT DOCUMENTS

| 2,554,306 | 5/1951 | Mack | 70/232 |
|---|---|---|---|
| 2,706,392 | 4/1955 | Lucas | 70/232 |
| 3,386,274 | 6/1968 | McIntyre | 70/232 |
| 3,706,211 | 12/1972 | Owen | 70/232 |
| 3,744,284 | 7/1973 | Weldenstrom | 70/232 |
| 3,757,550 | 9/1973 | Kayser | 70/232 |
| 4,132,093 | 1/1979 | McDorman | 70/231 |
| 4,141,233 | 2/1979 | Reyes | 70/232 |
| 4,553,415 | 11/1985 | Maffey | 70/232 |
| 4,620,718 | 11/1986 | Michilson | 280/507 |
| 4,697,444 | 10/1987 | Maffey | 70/232 |
| 4,704,883 | 11/1987 | Dikeys | 70/232 |

FOREIGN PATENT DOCUMENTS

| 689737 | 11/1960 | Canada | 70/232 |
|---|---|---|---|
| 1069561 | 1/1980 | Canada | 70/232 |
| 1535774 | 12/1978 | United Kingdom | 70/232 |

Primary Examiner—Robert L. Wolfe
Attorney, Agent, or Firm—Jerry T. Kearns

[57] ABSTRACT

A king pin lock for preventing unauthorized movement of a trailer when detached from a tractor includes a hemispherical body member having a flat planar face which faces the bottom surface of the trailer, when installed. A cylindrical trailer king pin has a circumferential groove for engagement into the fifth wheel of a towing tractor vehicle. The king pin lock has an aperture dimensioned to allow insertion of the trailer king pin. A pair of arcuate locking arms are pivotally mounted for radial movement within the hemispherical body member into and out of engagement with the king pin groove. A key actuated cam mechanism moves the locking arms between the lock and unlock positions. The locking mechanisms are assembled on a removable locking shell which may be replaced if necessary.

4 Claims, 4 Drawing Sheets

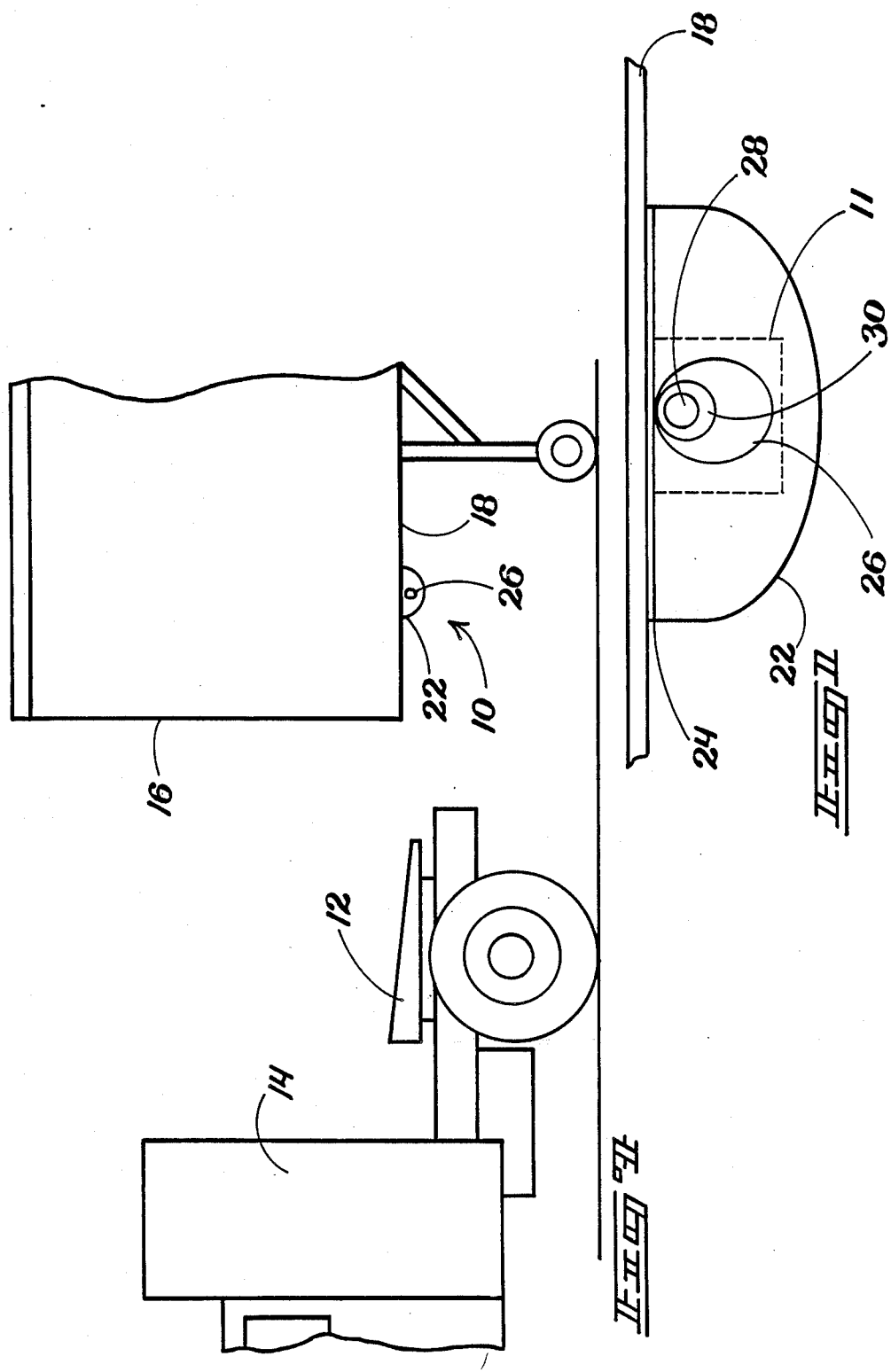

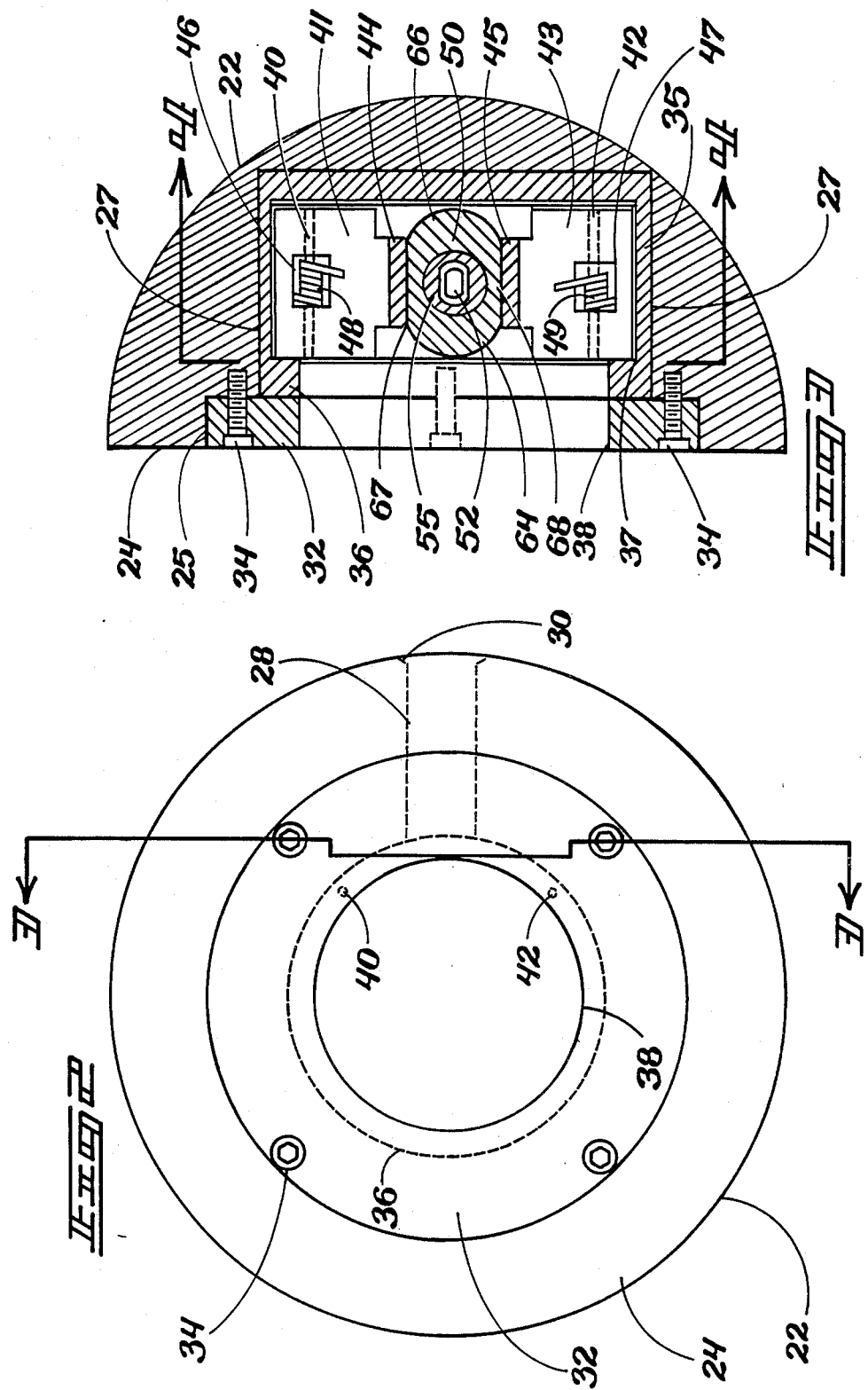

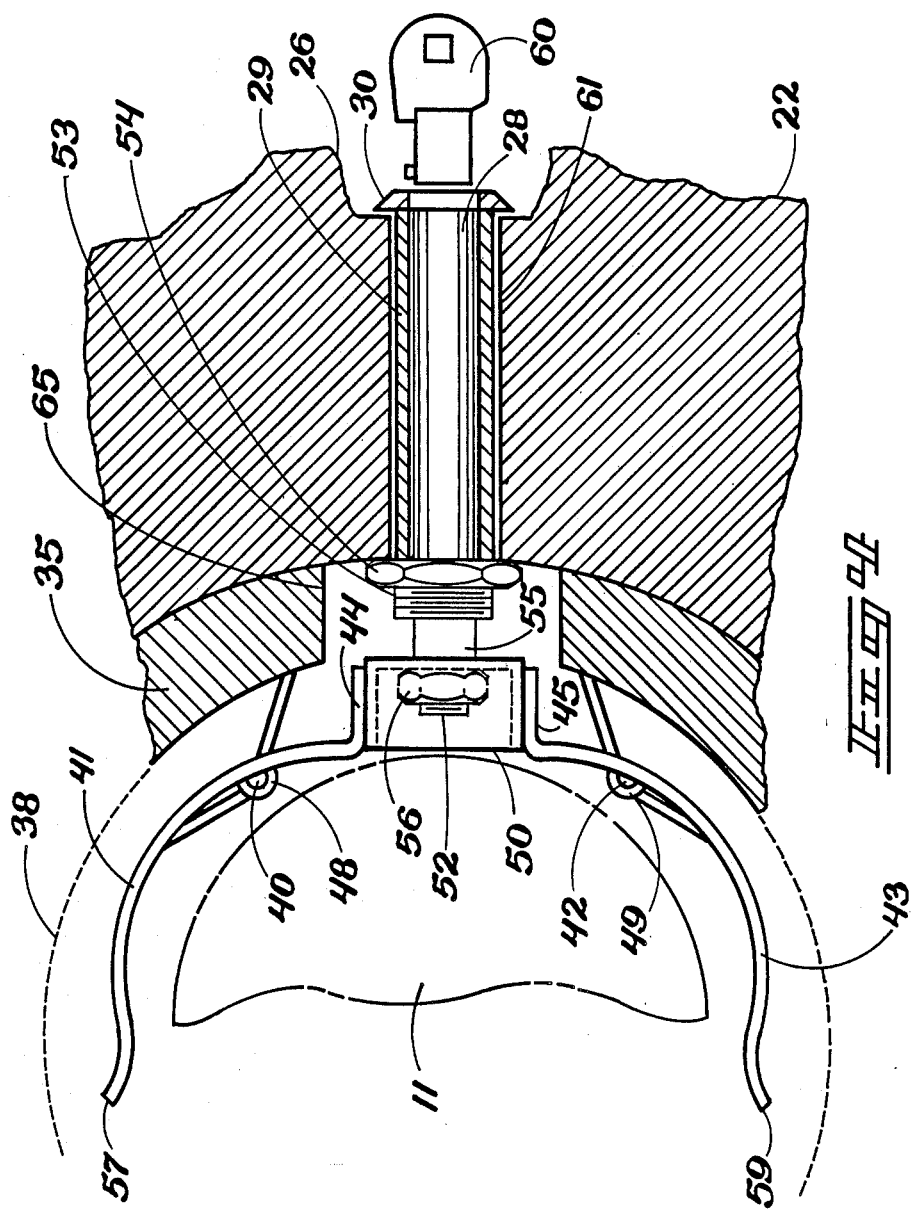

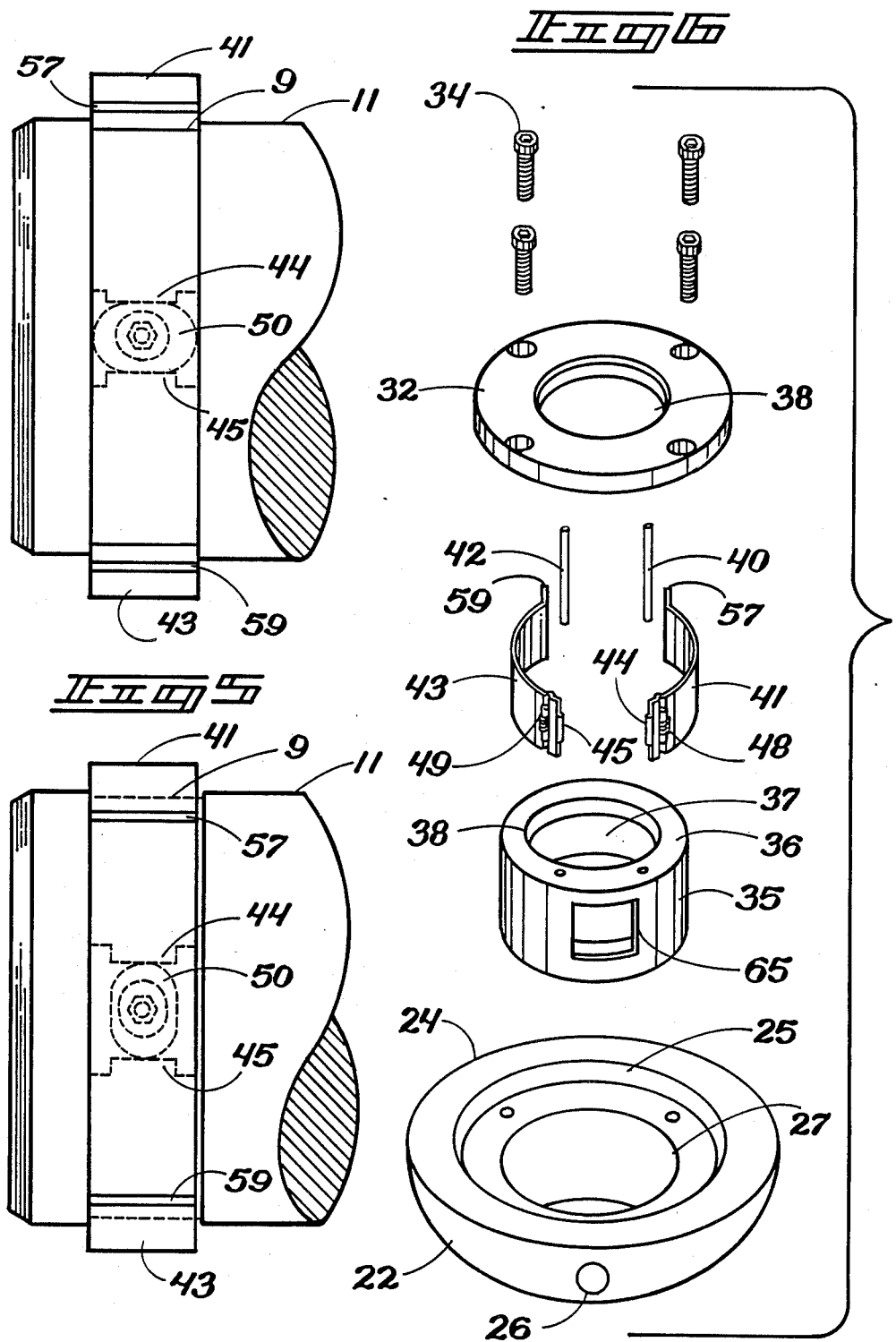

KING PIN LOCK

BACKGROUND OF THE INVENTION

1. Field of the Invention

The present invention relates to king pin locks, and more particularly pertains to a new and improved king pin lock to prevent unauthorized movement of a trailer when detached from a tractor. Conventional tractor-trailer trucking rigs utilize a cylindrical king pin having an exterior circumferential groove which extends downwardly from a bottom surface at the front edge of the trailer. The trailer king pin is received in a central aperture in the fifth wheel portion of the towing tractor vehicle. The trailers are frequently left unattended in large numbers in both loaded and unloaded conditions. Previously, the theft of such unattended trailers has been a large problem, because it is a simple matter to attach a tractor and merely drive away. In order to overcome this problem, the present invention provides a locking device which attaches to the king pin of a trailer to prevent engagement in the fifth wheel of a towing tractor.

2. Description of the Prior Art

Various types of king pin locks are known in the prior art. A typical example of such a king pin lock is to be found in U.S. Pat. No. 4,141,233, which issued to E. Reyes on Feb. 27, 1979. This patent discloses a king pin lock which includes locking collar halves each having a semi-annular body portion adapted for engagement with the circumferential exterior groove of a trailer king pin. One of the body portions is provided with an S-shaped flange having a hook end engagable in a slot on a flange on the other collar half. A padlock hasp is utilized to secure the two halves together. U.S. Pat. No. 4,553,415, which issued to C. Maffey on Nov. 19, 1985, discloses a king pin lock having a cylindrical body member provided with a central bore dimensioned to receive a king pin. A locking bar is inserted within a transverse aperture which communicates with the central bore and has an inner end adapted to be engaged within the king pin circumferential groove. The locking bar is secured in place by a key actuated locking cylinder. U.S. Pat. No. 4,620,718, which issued to T. Mickelson on Nov. 4, 1986, discloses a king pin lock which includes a body member provided with a longitudinal bore dimensioned to receive a cylindrical king pin of a trailer. A locking bar having an arcuate end portion adapted for engagement in the circumferential groove of the king pin is received in a transverse slot communicating with the central bore. A padlock is utilized to secure the locking bar in place. U.S. Pat. No. 4,697,444, which issued to C. Maffey on Oct. 6, 1987, discloses a king pin lock which includes a body member provided with a longitudinal bore and an intersecting transverse bore which receives a key actuated locking cylinder having an inner end dimensioned for engagement with the circumferential groove of a king pin. U.S. Pat. No. 4,704,883, which issued to J. Dikeys on Nov. 10, 1987, discloses a king pin lock which includes a cylindrical body member having a longitudinal bore dimensioned to receive a cylindrical trailer king pin. A transverse intersecting bore receives a key actuating locking cylinder having an inner end dimensioned for engagement in the circumferential groove of the king pin.

While the above mentioned devices are addressed to the solution of the same problem as the present invention, none of these devices provide a locking mechanism which engages a major circumferential portion within the circumferential groove of the king pin. Additionally, many of the above described devices feature exposed locking mechanisms which may be easily removed utilizing bolt cutters, hack saws or cutting torches. The present invention overcomes these disadvantages by providing a completely enclosed locking mechanism which is well protected from damage by theft attempts. Further, the present invention utilizes arcuate locking arms, actuated by a cam mechanism, which engage a major circumferential portion in the circumferential groove of a king pin, and provide an enhanced securement of the lock to the king pin. Inasmuch as the art is relatively crowded with respect to these various types of king pin locks, it can be appreciated that there is a continuing need for and interest in improvements to such king pin locks, and in this respect, the present invention addresses this need and interest.

SUMMARY OF THE INVENTION

In view of the foregoing disadvantages inherent in the known types of king pin locks now present in the prior art, the present invention provides an improved king pin lock. As such, the general purpose of the present invention, which will be described subsequently in greater detail, is to provide a new and improved king pin lock which has all the advantages of the prior art king pin locks and none of the disadvantages.

To attain this, a representative embodiment of the concepts of the present invention is illustrated in the drawings and makes use of a hemispherical body member having a flat planar face which faces the bottom surface of the trailer, when installed. A cylindrical trailer king pin has a circumferential groove for engagement into the fifth wheel of a towing tractor vehicle. The king pin lock has an aperture dimensioned to allow insertion of the trailer king pin. A pair of arcuate locking arms are pivotally mounted for radial movement within the hemispherical body member into and out of engagement with the king pin groove. A key actuated cam mechanism moves the locking arms between the lock and unlock positions. The locking mechanisms are assembled on a removable locking shell which may be replaced if necessary.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved king pin lock which has all the advantages of the prior art king pin locks and none of the disadvantages.

It is another object of the present invention to provide a new and improved king pin lock which may be easily and efficiently manufactured and marketed.

It is a further object of the present invention to provide a new and improved king pin lock which is of a durable and reliable construction.

An even further object of the present invention is to provide a new and improved king pin lock which is susceptible of a low cost of manufacture with regard to both materials and labor, and which accordingly is then susceptible of low prices of sale to the consuming public, thereby making such king pin locks economically available to the buying public.

Still yet another object of the present invention is to provide a new and improved king pin lock which provides in the apparatuses and methods of the prior art some of the advantages thereof, while simultaneously overcoming some of the disadvantages normally associated therewith.

Still another object of the present invention is to provide a new and improved king pin lock to prevent unauthorized movement of a trailer which utilizes a locking mechanism entirely enclosed within a protective housing.

Yet another object of the present invention is to provide a new and improved king pin lock which utilizes arcuate locking arms for engagement around a major circumferential portion within a king pin groove.

Even still another object of the present invention is to provide a new and improved king pin lock which utilizes replaceable locking components retained within an impervious protective shell.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side view, illustrating the king pin lock of the present invention installed on a king pin mounted on the bottom surface at the front end of a trailer.

FIG. 2 is a bottom view illustrating the flat planar face of the locking device.

FIG. 3 is a cross sectional view, taken along line 3—3 of FIG. 2, illustrating the details of the locking mechanism.

FIG. 4 is a cross sectional view, taken along line 4—4 of FIG. 3, further illustrating the construction of the locking mechanism.

FIG. 5 is a partial perspective view, illustrating the locking arms in locked and unlocked positions in engagement in the circumferential groove of a trailer king pin.

FIG. 6 is an exploded perspective view illustrating the components of the locking device.

FIG. 7 is a side view, illustrating the manner of use of the king pin locking device of the present invention.

DESCRIPTION OF THE PREFERRED EMBODIMENT

With reference now to the drawings, and in particular to FIG. 1 thereof, a new and improved king pin lock embodying the principles and concepts of the present invention and generally designated by the reference numeral 10 will be described.

More specifically, it will be noted that the first embodiment 10 of the invention includes a generally hemispherical body member 22 having a flat planar face 24 which, when the device is installed, is received over a cylindrical king pin 11 which extends from a bottom surface 18 of a conventional semi-trailer. A key actuated locking cylinder 28 is mounted within a housing or sleeve 30 which extends within a transverse bore formed in the hemispherical body member 22. A flared outer end 26 of the aperture provides access for operation of the lock cylinder 28.

FIG. 2 provides a plan view which illustrates the flat planar face 24 of the body member 22. A circular retaining plate 32 is secured by a plurality of screws 34 within an outer larger diameter portion of a stepped bore formed centrally through the body member 22. The retaining plate 32 overlies an outer end face 36 of an internal locking shell. A pair of locking arms, to be described subsequently, are mounted by pivot pins 40 and 42, within the locking shell, for radial movement toward and away from the central longitudinal axis of the body member 22. The locking cylinder 28 extends transversely through a side wall portion of the body member 22 and intersects the central bore. A radially outwardly extending flange 30 is provided on an outer end of the locking cylinder housing and aids in the securement of the locking cylinder within the transverse bore.

FIG. 3 illustrates a cross sectional view, taken along line 3—3 of FIG. 2. The hemispherical body member 22 is formed with a blind, stepped diameter central bore having an outer larger diameter portion 25 which opens to the flat planar face 24. A hollow cylindrical locking shell 35 is received in an inner reduced diameter portion 27 of the central bore. The circular retaining plate 32 secured in the outer larger diameter portion 25 of the central bore partially overlies an outer end face 36 of the locking shell 35. An interior undercut circumferential groove 37 is formed in the locking shell 35. Aligned circular bores 38 are formed through the retaining plate 32 and through the outer end face 36 of the locking shell 35 and are dimensioned to receive a conventional trailer king pin. A pair of arcuate locking arms 41 and 43 are mounted in the undercut groove 37 in the locking shell 35 for pivotal radial movement toward and away from the central axis of the central bore formed in the body member 22. The locking arms 41 and 43 are provided with openings 46 and 47 through which end portions of torsional coil springs 48 and 49 project. The springs 48 and 49 are received around pivot pins 40 and 42 and have a first end in abutment with a wall of the undercut groove 37 in the locking shell 35 and a second end in abutment with an interior face of the locking arm. The springs 48 and 49 bias the locking arms 41 and 43 to radially outer positions. Inner flange end portions 44 and 45 of the locking arms 41 and 43 are in engagement with opposite sides of a cam 50. The cam 50 has opposite arcuate end portions 64 and 66 connected by straight side walls 67 and 68. The cam 50 is secured on an end portion 52 of a rotary actuating shaft 55 of the key lock cylinder 28. Upon rotation of the cam 50 about the longitudinal central axis of the actuating shaft 55, the flanged end portions 44 and 45 of the locking arms 41 and 43 will be moved apart, causing pivotal movement of the opposite ends of the locking arms radially inwardly.

FIG. 4 depicts a cross sectional view, taken along line 4—4 of FIG. 3, which further illustrates the locking mechanism. A conventional king pin of a semi-trailer is received within the aligned bores 38. It should be noted that such conventional king pins are in the form of a cylindrical bar provided with an exterior circumferential undercut groove. The locking arms 41 and 43 are dimensioned and mounted for radial movement into and out of engagement with the king pin groove. The housing 29 of the key actuated locking cylinder 28 has a flanged end portion 30 which is received in a flared opening 26 in the hemispherical body member 22. The housing 29 and locking cylinder 28 extend coaxially through a transverse bore 61 which communicates with the longitudinal bore 38. A window aperture 65 is formed through the cylindrical side wall of the locking shell 35 and allows passage of the actuating shaft 55 of the key actuated locking cylinder 28. Upon insertion of a key 60, the actuating shaft 55 may be rotated through a limited circular arc in opposite directions, causing concurrent rotation of the cam 50. The housing 29 of the locking cylinder 28 has an inner threaded end portion for engagement of a conventional nut 54. The flange 30 in cooperation with the nut 54 serves to securely mount the locking cylinder within the transverse bore 61. The inner end 52 of the actuating shaft 55 has an oblong shape, with flat sidewall portions, as best seen in FIG. 3. The inner end 52 of the shaft 55 is received within a complementary formed passage formed centrally through the cam 50. A nut 56 is utilized to secure the cam 50 to the shaft 55. It should be noted that the end portion 52 of the shaft 55, while not completely circular, has circular threaded segments which allow engagement with the nut 56. The flanged ends 44 and 45 of the locking arms 41 and 43 are biased into engagement with opposite sides of the cam 50 by the torsional coil springs 48 and 49. These springs bias the opposite ends 57 and 59 of the locking arms 41 and 43 to a radially outer or unlock position. As may now be understood, manipulation of the key 60 causes rotation of the actuating shaft 55 and attached cam 50, with resultant radial movement of the locking arms 41 and 43 toward and away from the central longitudinal axis of the king pin 11.

FIG. 5 provides an illustration of the locked and unlocked positions of the cam 50 and locking arms 41 and 43. The left hand portion of FIG. 5 illustrates the cam 50 in a locked position in which the flanged end portions 44 and 45 of the locking arms 41 and 43 are forced apart. The right hand portion of FIG. 5 illustrates the cam 50 rotated to an unlocked position in which the flanged end portions 44 and 45 of the locking arms 41 and 43 are more closely spaced. In the locked position of the cam 50 illustrated in the left hand portion of FIG. 5, the locking arms 41 and 43 are in engagement with the circumferential undercut groove 9 formed on the king pin 11. In the unlocked position of the cam 50, illustrated in the right hand portion of FIG. 5, the locking arms 41 and 43 are moved radially outward, out of engagement with the groove 9 of the king pin 11. As may now be appreciated, the locking arms 41 and 43 surround a major portion of the circumference of the king pin 11, and thus provide a substantial strength or locking force advantage, as compared to prior art king pin locking devices in which a single narrow bar is inserted within the king pin groove.

FIG. 6 provides an exploded perspective view which illustrates the various components of the locking device of the present invention. The key locking cylinder and cam mechanism have been omitted for purposes of clarity. A complete understanding of these elements may be had with reference to FIGS. 3 and 4. It should be noted that any conventional form of key lock cylinder may be utilized, without departing from the scope of the present invention. The details of the mechanism of such key lock cylinders are well known and conventional and thus are considered outside the scope of the present invention. A suitable key locking cylinder mechanism for use in the present invention is of the type manufactured by the CHICAGO LOCK COMPANY and marketed under the trademark ACE. The window 65, formed through the locking shell 35, is placed in alignment with the transverse bore 26 formed through the hemispherical body member 22. The components of the cam and locking arm mechanisms 41 and 43 are mounted within the interior undercut circumferential groove 37 within the locking shell 35 by the pivot pins 40 and 42, as described previously.

FIG. 7 provides a side view which illustrates a conventional tractor 14 having a conventional fifth wheel 12 which is backed into engagement underneath the bottom surface 18 of the a conventional semi-trailer 16. In the absence of the locking device 10, the cylindrical king pin 11 (FIG. 1) is received within a vertically extending aperture formed centrally through a top surface of the fifth wheel 12. This serves to couple the tractor 14 to the trailer 16. This is of course an extremely simple and expedient operation, which has resulted in the theft of a large number of trailers. When the locking device 10 of the present invention is installed over the trailer king pin, the hemispherical body member 22 prevents engagement of the king pin with the fifth wheel 12. The body member 22 may be formed from any desired material, but is preferably constructed from a hard material such as high carbon steel, or titanium. For low security applications the housing may even formed from aluminum. The body member 22, as illustrated in FIG. 6, is formed separately from the various locking mechanisms of the device, allowing replacement of worn or defective elements without discarding the expensive body member 22. Additionally, this allows for the insertion of variously dimensioned locking shells 35 and locking arm mechanisms, dimensioned for use with different diameter trailer king pins.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A king pin lock for securement to a cylindrical king pin of a trailer having an exterior circumferential undercut groove, said lock comprising:

a generally hemispherical body member having a blind stepped diameter central bore;

an outer larger diameter portion of said central bore opening to a flat planar face of said hemispherical body member;

a hollow cylindrical locking shell received in an inner reduced diameter portion of said central bore;

said locking shell having an interior undercut groove;

a circular retaining plate secured in said outer larger diameter portion of said central bore and partially overlying an outer end face of said locking shell;

aligned circular bores dimensioned to receive a trailer king pin formed through said retaining plate and said outer end face of said locking shells;

aligned transverse apertures formed through a side wall of said hemispherical body member and said locking shell;

a key operated lock cylinder secured in said transverse aperture of said hemispherical shell;

an inner end of a rotary actuating shaft of said lock cylinder extending through said transverse aperture of said locking shell;

a cam, in said locking shell, having arcuate opposite end portions connected by straight side walls and secured for rotation with said actuating shaft;

a pair of arcuate locking arms disposed in said undercut groove in said locking shell, on opposite sides of said cam;

each of said locking arms having a first end portion abutting said cam, and a second end portion remote from said cam;

a pivot pin, extending parallel to a central longitudinal access of said cylindrical locking shell, adjacent the first end portion of each of said locking arms and mounting said locking arms for limited pivotal radial movement; and a torsional coil spring received around each of said pivot pins, biasing said locking arms to radially outer positions, whereby a trailer king pin may be inserted into said locking shell and said locking arms may be moved radially inwardly into engagement with the exterior undercut groove of the king pin by rotating said cam by rotation of said actuating shaft of said key lock cylinder.

2. The kingpin lock of claim 1, wherein said locking arms are dimensioned to surround a major circumferential extent of a trailer king pin when in a locked position.

3. The kingpin lock of claim 1, wherein said first end portions of said locking arms are disposed in engagement with said arcuate opposite end portions of said cam in an unlocked position.

4. The kingpin lock of claim 1, wherein said first end portions of said locking arms are disposed in engagement with said straight sidewalls of said cam in a locked position.

* * * * *